United States Patent [19]

Hamasaki et al.

[11] Patent Number: 4,568,814

[45] Date of Patent: Feb. 4, 1986

[54] METHOD AND APPARATUS FOR CUTTING CONCRETE BY USE OF LASER

[75] Inventors: Masanobu Hamasaki, Takamatsu; Munehide Katsumura, Kagawa, both of Japan

[73] Assignees: Agency of Industrial Science & Technology; Ministry of International Trade & Industry, both of Tokyo, Japan

[21] Appl. No.: 575,299

[22] Filed: Jan. 30, 1984

[30] Foreign Application Priority Data

Apr. 18, 1983 [JP] Japan .................................. 58-69563

[51] Int. Cl.$^4$ ............................................. B23K 27/00
[52] U.S. Cl. ........................ 219/121 LH; 219/121 LJ; 376/310
[58] Field of Search .................. 219/121 LH, 121 LJ, 219/121 LN, 121 LG, 121 L, 121 LM; 376/308, 310

[56] References Cited

U.S. PATENT DOCUMENTS 3,817,348 6/1974 Jones ................................. 376/249 X
4,436,694 3/1984 Vassalotti et al. ................. 376/249 X

FOREIGN PATENT DOCUMENTS 1119948 7/1968 United Kingdom ......... 219/121 LH

OTHER PUBLICATIONS

Decontamination and Decommissioning of Nuclear Facilities, Plenum Press, New York, 1980, pp. 433-441 and 547-557.

Primary Examiner—C. L. Albritton
Attorney, Agent, or Firm—Oblon, Fisher, Spivak, McClelland & Maier

[57] ABSTRACT

The slag formed when concrete is melted by exposure to a laser beam, when caused to incorporate therein a MgO-rich supplementary material, loses it viscosity and, on cooling, refrains from expanding and, consequently, assumes a readily removable state. The slag thus set can be easily removed by allowing a cleaning device such as the rotary wire brush to pass along the part of concrete melted by the laser beam. In accordance with this method, the apparatus for cutting concrete can be readily applied to a remote control system and will manifest an outstanding effect in a highly hazardous site such as is involved in the dismantling of a biological shield wall of concrete in a nuclear reactor.

14 Claims, 4 Drawing Figures

FIG. 2(A)　FIG. 2(B)
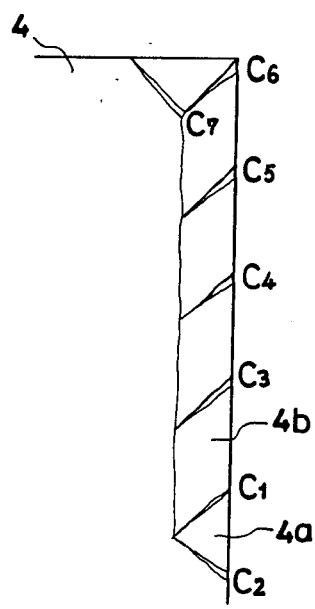
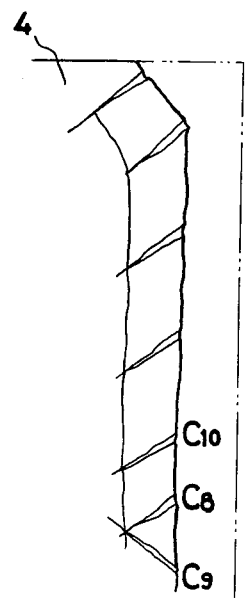
FIG. 3
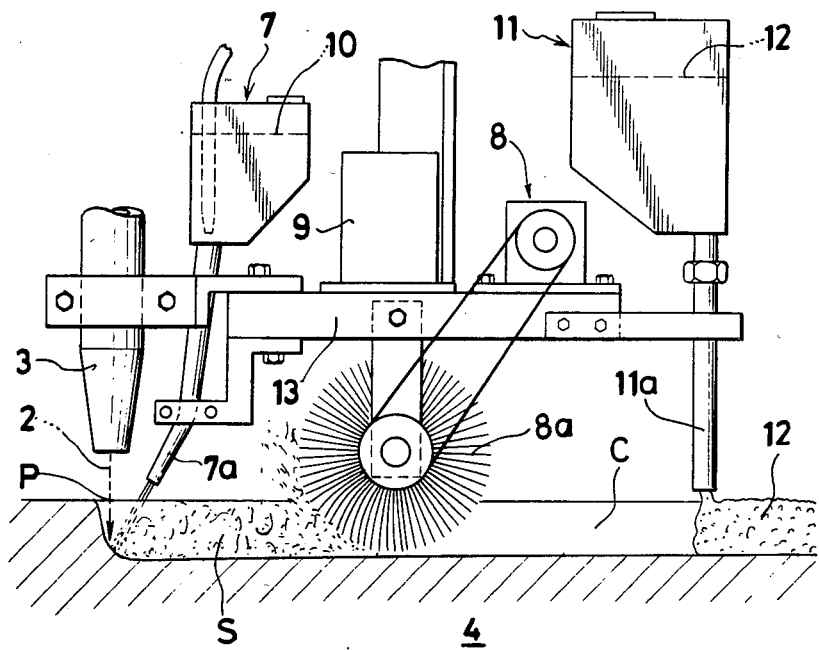

METHOD AND APPARATUS FOR CUTTING CONCRETE BY USE OF LASER

BACKGROUND OF THE INVENTION

This invention relates to a method and apparatus for cutting concrete by the use of a laser, and more particularly to a method and apparatus which enables the molten slag occurring during the melt cutting of concrete by the use of a laser to be easily removed by lowering the viscosity or the molten slag and preventing the molten slag from expanding in the course of setting and which can be effectively used not merely for cutting but also for gouging and breaking the concrete by remotely controlled operation of the apparatus.

In the fields of civil engineering and construction, materials of plain concrete and reinforced concrete, materials of various metallic substances including stainless steel, and materials of non-metallic substances are generally cut and otherwise processed by use of various tools. When operations of this nature are carried out by the use of conventional mechanical tools, they prove inefficient because such tools must be changed as the materials to be treated are changed. In an extreme case, such operations turn out to be infeasible. To overcome this difficulty, highly powerful lasers have come to be adopted for performing such operations on various materials of stainless steel and other metallic substances and non-metallic substances. Persons experiencing difficulties in the cutting of concrete, therefore, may readily conceive an idea of using such a laser for the purpose of concrete cutting. Although the cutting of concrete by the use of a laser is recognized to be theoretically possible, there are problems yet to be solved in reducing the principle to practice. For example, this operation entails the disadvantage that the molten slag issuing from molten concrete assumes a glassy state and exhibits high viscosity and, on being cooled, expands and adheres fast to the walls of the gouge cut by the laser beam and becomes difficult to remove.

Thus, the cutting of concrete is still difficult even by the use of a laser. Particularly when the operation of concrete cutting by means of a laser is carried out at a site where the work conditions are harsh, the efficiency of the operation is notably degraded even to a point where the operator is exposed to danger. The work of dismantling a nuclear reactor may be cited as a case in point.

The service life of a nuclear reactor, though variable with the availability factor of the particular nuclear reactor, is generally estimated to be about 40 years. After lapse of this service life, the atomic power is decommissioned. The dismantling of the reactor is one part of the decommissioning operation. The concrete wall which has served as a biological shield concrete is also broken down. Generally, the concrete wall comprises a stainless steel plate (about 6 mm in thickness), a plain concrete layer (about 100 mm in thickness), and a reinforced concrete layer (1 to 1.5 m in thickness), sequentially from the inner side. Since it is formed of dissimilar substances, it has been necessary to use various cutting tools such as a disk cutter, grinding cutter, and scissors cutter, alternately according to the materials to be cut. Since this dismantling operation requires complicated use of cutting tools, it has been held that the operation cannot be automated.

Even after the nuclear reactor has been shut down, the biological shield concrete still retains a significant amount of residual radiation. Thus, the cutting work performed on the biological shield concrete must be carried out under remote control. Even then, the changing of various cutting tools has to be carried out manually. The fact that the tools soiled with radioactive dust must be interchanged by the human hand is most undesirable thing from the standpoint of safety.

In the circumstance, a cutting device which provides effective cutting of the concrete and particularly enables the biological shield wall of the nuclear reactor to be easily and safely cut has been desired.

SUMMARY OF THE INVENTION

An object of this invention is to provide a method and apparatus for performing various operations such as cutting, gouging, and breaking of articles of plain concrete and reinforced concrete by the use of a laser, which permit the aforementioned operations to be effectively and efficiently performed by precluding the occurrence of adverse effects from the molten slag produced while the aforementioned operations are in progress.

Another object of the present invention is to provide a method and apparatus for cutting concrete, which enable composite materials of concrete and stainless steel or other similar metallic substances to be effectively cut, permit the removal of molten slag issuing from the cutting work mentioned above and the supply of crushing material to be simultaneously carried out by one integral mechanical unit, allow the operation of the apparatus to be automated and remotely controlled, and even permit the dismantling of the biological shield concrete in a nuclear reactor to be safely and accurately carried out.

To accomplish the objects described above according to this invention, there is provided a method for cutting concrete comprising the steps of moving the concrete forward and exposing the part of the concrete desired to be cut to a laser beam, feeding a supplementary material rich in MgO to the part of the concrete melted by the exposure to the laser beam, and subsequently removing the molten slag set as wrapped around the aforementioned supplementary material by means of a cleaning device.

The apparatus contemplated by this invention to be used in working the concrete cutting method described above comprises a laser irradiation device for projecting a laser beam along the part of the article under treatment, a supplementary material supplying device for continuously feeding a MgO-rich supplementary material to the part of the article melted by the exposure to the laser beam, and a cleaning device disposed behind the supplementary material supplying device relative to the advancing direction thereof and adapted to remove the molten slag set in the part of the article melted by the aforementioned exposure to the laser beam.

Where the article to be treated is made of concrete, the part of the article melted by the laser beam is turned into molten slag which assumes a glassy viscous state. When this molten slag cools off and expands, it adheres fast to the melted part of the article and becomes difficult to remove. When this slag, while in a molten state, is mixed with the MgO-rich supplementary material, it does not set fast to the article but instead assumes a readily crushable state. When the slag which has been mixed with the supplementary material and immediately allowed to set is scrubbed with a cleaning device such as, for example, a rotary wire brush, it can be readily removed.

The laser irradiation device, the supplementary material supplying device, and the cleaning device can be combined into a compact integral system and their individual operations can be remotely controlled as desired. With this apparatus, therefore, the cutting of concrete can be carried out safely and accurately even under conditions possibly injurious to the human system.

The other objects and characteristics of the present invention will become apparent to those skilled in the art as the further disclosure of the invention is made in the following detailed description with reference to the accompanying drawings.

BRIEF EXPLANATION OF THE DRAWINGS

FIGS. 2(A) and 2(B) are explanatory diagrams illustrating a procedure used in the work of dismantling.

FIG. 3 is a side view schematically illustrating the construction of one typical apparatus of this invention.

DESCRIPTION OF THE PREFERRED EMBODIMENT

Figure 1:
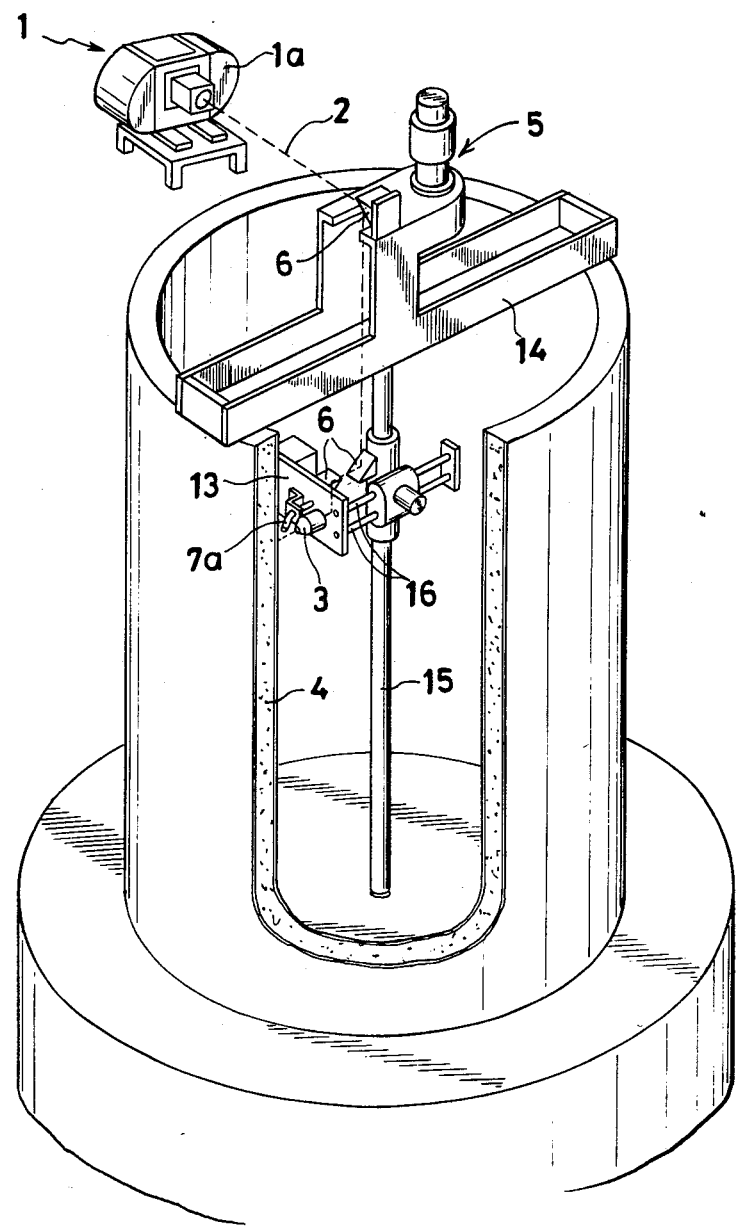
FIG. 1 is an explanatory diagram illustrating a typical application of the method and apparatus of this invention to the dismantling of the biological shield wall of a nuclear reactor.

This invention relates to a method and apparatus for performing gouging, breaking, cutting, and other operations particularly on materials of concrete by the use of a laser. The apparatus is so constructed as to perform such operations effectively and efficiently on concrete materials and permit such operations to be remotely controlled. Now, one embodiment of this invention as applied to the dismantling operation of the biological shield concrete of a nuclear reactor, an operation entailing conditions under which the aforementioned effect of this invention can be manifested fully, will be described below with reference to the accompanying drawings.

A shield wall 4 of a nuclear reactor illustrated in FIG. 1 is made of concrete in a thickness of 1 to 1.5 m. Even by the use of a highly powerful laser beam 2, it cannot be cut through all at once. The dismantling of this concrete wall requires a procedure which comprises forming a multiplicity of gouges $C_1$, $C_2$, . . . inside the shield concrete wall 4 with a laser beam as illustrated in FIG. 2, filling the gouges with a nonexplosive demolition agent, and causing the portions of the concrete wall surrounding the gouges to be broken by the inflating force of the non-explosive demolition agent. (This procedure will be described in further detail afterward.)

FIG. 2 illustrates that the gouges $C_1$, $C_2$, . . . formed by the laser beam have a slag section of the shape of a sharply pointed wedge. These gouges are formed by melting the concrete wall with the laser beam and, therefore, are filled with the slag which has been melted out of the concrete and subsequently allowed to set. The removal of this slag from the gouges has been a difficult task.

In the cutting of concrete by means of a laser beam, this invention contemplates facilitating the removal of the slag by continuously supplying a MgO-rich supplementary material to the melted portion of concrete which moves in concert with the moving point of the laser beam impinging on the concrete thereby enabling the chemical composition of the molten concrete to contain MgO at all times in the range of 20 to 40%.

Specifically, concrete generally comprises cement, sand, and gravel and the weight ratio of these three components is normally about 1:2:4.

Portland cement, for example, comprises 20 to 26% of $SiO_2$, 4 to 9% of $Al_2O_3$, 2 to 4% of $Fe_2O_3$, 60 to 66% of CaO, and 1 to 3% of MgO. Thus, it consists preponderantly of $SiO_2$ and CaO.

Sand is composed of 80% of $SiO_2$ and 20% of other substances.

As the gravel, andesite is used in the largest amount, followed by basalt, limestone, graywacke, amphibolite, and granite. As is well known, the chemical compositions of such gravels vary widely by area of production. Typical chemical compositions of such gravels are shown in the following table by way of example.

|  | Andesite | Basalt | Limestone | Sandstone | Granite | Sand |
|---|---|---|---|---|---|---|
| $SiO_2$ | 54 | 50 | 5 | 78 | 72 | 80 |
| $Al_2O_3$ | 17 | 14 | 1 | 5 | 14 | — |
| CaO | 8 | 10 | 42 | 5 | 1 | — |
| MgO | 4 | 8 | 8 | 1 | 1 | — |
| Other substances | 9 | 14 | 44 | 11 | 12 | 20 |

One type of concrete using the andesite gravel, therefore, has a chemical composition of 57% of $SiO_2$, 11% of $Al_2O_3$, 13% of CaO, 3% of MgO, and 16% of other substances. The molten slag produced when this concrete is melted by the laser beam has substantially the same chemical composition.

When the molten slag assumes a glassy state and acquires viscosity and expands on cooling, it adheres fast to the opposed wall surfaces of wedge-shaped gouges and becomes difficult to remove.

It is well known that the molten slag assumes the glassy state because it contains much $SiO_2$. The fact that the molten slag expands on cooling is also ascribable to the chemical composition thereof.

Through experiments, the inventor has ascertained that the molten slag acquires the aforementioned readily removable state when it contains 20 to 40% of MgO.

As pointed out above, ordinary concrete contains only 1 to 3% of MgO. Thus, the present invention contemplates artificially increasing the MgO content of the molten slag by supplying the MgO-rich supplementary material to the melted portion of concrete produced by the exposure to the laser beam.

This incorporation of the additional MgO facilitates the removal of the set slag. When BaO is also incorporated into the molten slag so as to increase the BaO content to a level in the range of 10 to 15%, satisfactory results are obtained in the removal of the set slag. The supplementary material may additionally incorporate therein BaO in an amount calculated to increase the BaO content to that level.

The method for supplying the MgO-rich supplementary material to the melted portion of the concrete is a matter left to be devised by the field technician. Generally, this supply can be effected by spouting MgO in a pulverized form carried on an air current through a supply nozzle against the part of the concrete melted by the exposure to the laser beam. The laser beam proves advantageous because it is not disturbed by the air current. The use of the air current has a desirable effect of agitating the molten concrete and facilitating the incorporation of the supplementary material therein.

The molten slag thus formed, on setting, does not adhere fast to the wall surfaces of the gouges and can be easily removed from within the gouges by a mechanical cleaning device.

FIG. 3 illustrates a typical apparatus of this invention for cutting concrete. The main parts of this apparatus are a laser device 1 for sequentially moving the laser action point P on the concrete material (only an irradiation unit 3 thereof is illustrated in FIG. 3), a supplementary material supplying device 7 for continuously supplying a pulverized material 10 formed mainly of MgO to the melted part of the concrete at the laser action point P, and a rotary cleaning device 8 adapted to follow the path of the supplementary material supplying device 7 and remove the set slag S from the melted part of the concrete. The rotary cleaning device 8 used in the present embodiment comprises an electric motor and a rotary wire brush 8a rotated by the motor. When the apparatus is used on a concrete material of large thickness such as the shield concrete wall in a nuclear reactor, it additionally incorporates therein a demolition agent supplying device 11 adapted to inject a nonexplosive demolition agent 12 into the part of the concrete from which the slag S has been removed as described above.

The three movable components, i.e. the laser device 1, the supplementary material supplying device 7, and the rotary cleaning device 8, or the four movable components, i.e. the three devices mentioned above plus the supplementary agent supplying device 11; more specifically the laser action part 3, the supplementary material nozzle 7a, the wire brush 8a and/or the demolition agent nozzle 11a are parallelly disposed on one and the same machine frame 13 and moved simultaneously.

Consequently, the supplementary material 10 is allowed to reach, without fail, the farthest side of the molten slag within the gouge C cut by the laser beam, the leading end of the rotary cleaning device, namely, the wire brush 8a, is allowed to enter the cavity of the gouge C and remove the set slag from within, and the demolition agent nozzle 11a is allowed to be properly directed to the gouge C. The devices other than the laser action part 3 may be adapted to follow the path of the laser action part 3. In this arrangement, however, special purpose sensors are required for the purpose of enabling such trailing devices to enter the narrow cavity of the gouge C. When such trailing devices are arrayed behind the laser action part 3 in the order of work procedure and moved simultaneously therewith as in the apparatus of this invention, the after-treatments can be carried out simply.

When the wire brush 8a is used as the rotary cleaning device 8, the practice of bringing it into contact with the slag S after this slag S has cooled to some extent proves advantageous in the sense that the brush is damaged less easily by the partly cooled slag. Thus, the apparatus of this invention is desired to be constructed so that the distance between the laser action part 3 and the wire brush 8a may be adjusted in proportion to the speed at which the laser beam forms a gouge in the concrete.

The formation of gouges in the concrete by the laser beam is not always required to proceed in a horizontal direction. Optionally, it may proceed in a vertical direction. In due consideration of this choice between the two directions, therefore, the apparatus of FIG. 3 is designed so that the frame 13 can be rotated by 90° by an actuator 9.

Now, a typical application of the apparatus of this invention exclusively to the dismantling of the shield concrete wall of the nuclear reactor will be described and the procedure of work involved therein will be explained.

As illustrated in FIG. 1 and FIG. 3, this apparatus comprises a beam member 14 mounted on the upper edge of the tubular concrete shield wall 4 remaining after the removal of the pressure vessel, a vertical guide column 15 hung down along the axis of the shield concrete wall, a laser action part 3 disposed at the leading end of a horizontal arm 16 adapted to be rotated horizontally and elevated vertically by a drive mechanism 5 at the upper part of the column 15, a laser generating device 1a disposed above the shield concrete wall 4 and adapted to emit a laser beam 2 to the laser action portion via a reflecting mirror 6 adapted to be rotated horizontally in conjunction with the aforementioned horizontal arm 16, a supplementary material supplying device 7 for continuously supplying a pulverized supplementary material 10 formed preponderantly of MgO to the part of the concrete melted at the laser action point P, a slag removing device 8, and a demolition agent supplying device 11.

This apparatus is constructed so that the drive mechanism 5, on receiving proper commands, will cause the moving parts, i.e. the nozzles 7a, 11a and the wire brush 8a, respectively of the supplying devices 7 and 11 and cleaning device 8, as well as the laser action part 3 disposed collectively on the horizontal arm 16 to be horizontally rotated and vertically moved to sequentially break the shield concrete wall 4 from inside.

The procedure followed in dismantling the shield concrete wall 4 by the use of the apparatus designed exclusively for dismantling will be described with reference to FIG. 2. FIG. 2(A) illustrates the steps of first forming a downwardly slanted gouge $C_1$ in the inner side of the shield concrete wall 4 (by horizontally rotating the laser action part 3 and the trailing devices along the wall 4), then after the gouge has been formed throughout the entire inner side, forming an upwardly slanted gouge $C_2$ throughout the entire inner wall thereby severing a circle 4a of a triangular cross section from the concrete wall, forming a gouge $C_3$ slightly above the removed circle throughout the entire inner side, and filling the gouge $C_3$ with a demolition agent thereby enabling the demolition agent to expand after lapse of several hours and induce natural detachment of the circle 4b. By repeating these steps, the gouges $C_4$, $C_5$, $C_6$, . . . are sequentially formed and next circles are made to fall off. The gouge $C_7$ represents the step which is to form the uppermost circle of the inner part of the shield concrete wall.

FIG. 2(B) illustrates the procedure for removing the second layer of the inner side of the shield concrete wall 4 by following the steps of FIG. 2(A) after the surface layer thereof has been removed as described above with reference to FIG. 2(B).

The invention has been described with reference to one embodiment thereof. Naturally, this invention can be variously modified and applied by the field technician in accordance with known techniques without departing from the spirit thereof. In the cutting of an ordinary concrete material, the cutting work can be improved in terms of quality and efficiency owing to the supply of the supplementary material. The supplementary materials of MgO and BaO need not be refined products. The purpose of these supplementary materials can be fulfilled by adjusting the amounts of their supply in accordance with the contents of MgO and BaO in the materials. The rotary cleaning device is not necessarily limited to the wire brush. A combination of a vibrating crusher and a suction means and instead, other similar means may be used. The condition that the nozzles and other movable components should be attached to one and the same frame may be fulfilled by having them in a substantially fixed relation. The relation illustrated is not limiting.

This invention originated from a study directed to elucidate, in the aspect of chemical composition, the problem of the difficult removal of the molten slag occurring during the cutting of concrete by the use of a laser beam. It has been perfected by a discovery that the slag can be very easily moved when the slag, while still in a molten state, incorporates therein MgO supplied from outside. The apparatus for working the method based on this principle has the laser action part, the supplementary material supplying part, and the cleaning part disposed serially on one and the same frame. Since these parts are advanced as fixed on the frame, the supplementary material and the cleaning means are allowed to enter the gouge formed by the laser action part without fail. Thus, the remote control of the apparatus is easier to obtain in the apparatus of this invention than when these components are operated independently of each other.

Particularly when this invention is embodied in an apparatus to be used exclusively for the dismantling of the shield concrete wall in a nuclear reactor, the laser action part and the trailing parts are attached to a horizontal arm fixed horizontally rotatably and vertically movably on a guide column which hangs down along the axis of the tubular shield concrete wall from a beam mounted on the upper edge of the shield concrete wall. Consequently, the work of advancing the laser beam to the moving point of its impingement on the concrete and the work of forming gouges on the inner side of the shield concrete wall are notably simplified.

What is claimed is:

1. A method for cutting concrete by the use of a laser, which comprises the steps of moving a laser along the part of the concrete under treatment while directing the laser beam therefrom to said part, supplying a supplementary material rich in MgO to the part of the concrete melted by said laser beam, and performing the work of gouging, breaking, or cutting, for example, on the concrete by utilizing the melted part thereof.

2. A method according to claim 1, wherein said supplementary material supplied to the part of concrete melted by said laser beam is formulated so that the part of the concrete melted by the laser beam and subsequently caused to incorporate therein the supplementary material always contains 20 to 40% of MgO in the chemical composition thereof.

3. A method according to claim 1, wherein said supplementary material richly contains BaO in addition to MgO.

4. A method according to claim 3, wherein said supplementary material is supplied to a laser action point so that said part of the concrete melted by the laser beam contains 20 to 40% of MgO and 10 to 20% of BaO in the chemical composition thereof.

5. A method according to claim 1, wherein a cleaning device is moved to follow the path of said laser means and said supplementary material supplying means to scrub and remove the part of concrete which has been melted and subsequently allowed to set.

6. A method according to claim 5, wherein said portion of the concrete which has been melted by the laser beam and caused to incorporate therein said supplementary material is allowed to set and is subsequently removed by scrubbing and a concrete demolition agent is supplied to the cavity resulting from said removal of the set slag.

7. An apparatus for cutting concrete, comprising a frame movable along the part of the concrete under treatment, laser device having fastened to said frame an irradiation part capable of generating a laser beam and irradiating said part of concrete with said laser beam, supplementary material supplying means fixed to said frame near said laser device and adapted to supply a supplementary material rich in MgO to the part of the concrete melted by exposure to said laser beam, and cleaning means fixed to said frame moved along the part of the concrete under treatment as separated rearwardly from said supplementary material supplying means relative to the direction of movement of said frame and adapted to remove slag melted out of the concrete by exposure to said laser beam and subsequently allowed to set.

8. An apparatus according to claim 7, wherein said supplementary material supplied by said supplementary material supplying means to the part of the concrete melted by exposure to said laser beam is formulated so that the part of the concrete melted by the laser beam contains 20 to 40% of MgO in the chemical composition thereof.

9. An apparatus according to claim 7, wherein said supplementary material further contains BaO.

10. An apparatus according to claim 9, wherein said supplementary material supplied by said supplementary material supplying means to the part of the concrete melted by exposure to said laser beam is formulated so that the part of the concrete melted by said laser beam contains 20 to 40% of MgO and 10 to 20% of BaO in the chemical composition thereof.

11. An apparatus according to claim 7, wherein said cleaning means comprises an electric motor and a wire brush rotated by said electric motor.

12. An apparatus according to claim 7, which further comprises concrete demolition agent supplying means fixed on said frame behind said cleaning means relative to the direction of movement of said frame and adapted to supply a concrete demolition agent to the cavity left by the removal of said slag by said cleaning means.

13. An apparatus according to claim 7, wherein said frame having fixed thereon said laser device, said supplementary material supplying means and said cleaning means is retained horizontally movably by a horizontal arm, said horizontal arm is retained horizontally rotatably and vertically movably by a vertical guide column, and drive means for imparting horizontal rotation and vertical motion to said horizontal arm and said vertical guide column is provided on said vertical guide column.

14. An apparatus according to claim 7, wherein said cleaning means is retained by said frame so as to have the position thereof freely moved relative to said laser device and said supplementary material supplying means.

* * * * *